(12) United States Patent
Shpak

(10) Patent No.: US 12,336,009 B2
(45) Date of Patent: Jun. 17, 2025

(54) ANONYMOUS COLLECTION OF DIRECTIONAL TRANSMISSIONS

(71) Applicant: Deeyook Location Technologies Ltd., Tel Aviv (IL)

(72) Inventor: Eran Shpak, Tel Aviv (IL)

(73) Assignee: Deeyook Location Technologies Ltd, Tel-Aviv (IL)

( * ) Notice: Subject to any disclaimer, the term of this patent is extended or adjusted under 35 U.S.C. 154(b) by 312 days.

(21) Appl. No.: 17/866,620

(22) Filed: Jul. 18, 2022

(65) Prior Publication Data

US 2022/0361244 A1 Nov. 10, 2022

Related U.S. Application Data

(63) Continuation-in-part of application No. PCT/IB2020/060801, filed on Nov. 17, 2020, which
(Continued)

(51) Int. Cl.
*H04W 74/0816* (2024.01)
*H04L 5/00* (2006.01)
(Continued)

(52) U.S. Cl.
CPC ....... *H04W 74/0816* (2013.01); *H04L 5/0007* (2013.01); *H04L 27/2607* (2013.01);
(Continued)

(58) Field of Classification Search
CPC ... H04W 4/029; H04W 48/14; H04W 64/003; H04W 72/541; H04W 74/02;
(Continued)

(56) References Cited

U.S. PATENT DOCUMENTS 8,504,063 B2 8/2013 Ekbatani
8,848,730 B1 * 9/2014 Vleugels ............... H04W 48/14
370/304
(Continued)

FOREIGN PATENT DOCUMENTS

CN 106101047 A 11/2016
EP 1710960 B1 12/2008
(Continued)

OTHER PUBLICATIONS

Kotaru et al., "SpotFi: Decimeter Level Localization using WiFi", SIGCOMM '15, London, UK, pp. 269-282, Aug. 17-21, 2015.
(Continued)

*Primary Examiner* — Michael Thier
*Assistant Examiner* — Prince A Mensah
(74) *Attorney, Agent, or Firm* — Meitar Patents Ltd.; Daniel Kligler

(57) ABSTRACT

A method for communication includes detecting, at a first station in a wireless network, a beacon transmitted over the wireless network by a second station having multiple antennas. In response to the beacon, a request-to-send (RTS) frame is transmitted over the wireless network using a multi-carrier modulation scheme from the first station to the second station. The first station receives a clear-to-send (CTS) frame transmitted over the wireless network, in response to the RTS frame, by the second station via the multiple antennas using the multi-carrier modulation scheme, and estimates a property of the first station based on the received CTS frame.

30 Claims, 4 Drawing Sheets

Related U.S. Application Data is a continuation of application No. 16/783,196, filed on Feb. 6, 2020, now Pat. No. 11,240,846.

(51) Int. Cl.
    *H04L 27/26*     (2006.01)
    *H04W 4/029*     (2018.01)
    *H04W 64/00*     (2009.01)
    *H04W 84/12*     (2009.01)
    *H04L 101/622*     (2022.01)

(52) U.S. Cl.
CPC ......... *H04W 4/029* (2018.02); *H04W 64/003* (2013.01); *H04W 84/12* (2013.01); *H04L 2101/622* (2022.05)

(58) Field of Classification Search
CPC ............. H04W 74/08; H04W 74/0808; H04W 74/0816; H04W 84/12; H04L 5/00–0012; H04L 27/26–2607; H04L 2101/60; H04L 2101/622
See application file for complete search history.

(56) References Cited

U.S. PATENT DOCUMENTS

| | | | |
|---|---|---|---|
| 9,380,607 B2 | 6/2016 | Bourlas et al. | |
| 9,814,051 B1 | 11/2017 | Shpak | |
| 9,838,536 B2 | 12/2017 | Jung et al. | |
| 10,153,857 B1 | 12/2018 | Chu et al. | |
| 10,306,506 B2 | 5/2019 | Dinan | |
| 11,215,688 B2 | 1/2022 | Shpak | |
| 11,240,846 B2 | 2/2022 | Shpak | |
| 2003/0048770 A1 | 3/2003 | Proctor | |
| 2003/0169763 A1* | 9/2003 | Choi | H04W 74/02 370/445 |
| 2004/0013128 A1* | 1/2004 | Moreton | H04W 74/02 370/447 |
| 2005/0207381 A1 | 9/2005 | Aljadeff et al. | |
| 2009/0243932 A1 | 10/2009 | Moshfeghi | |
| 2010/0085950 A1 | 4/2010 | Sekiya et al. | |
| 2010/0302102 A1 | 12/2010 | Desai et al. | |
| 2012/0063340 A1 | 3/2012 | Waters et al. | |
| 2013/0136013 A1* | 5/2013 | Kneckt | H04W 72/541 370/252 |
| 2014/0327579 A1 | 11/2014 | Hart et al. | |
| 2014/0334387 A1 | 11/2014 | Doppler et al. | |
| 2015/0012971 A1 | 1/2015 | Ram et al. | |
| 2015/0312278 A1 | 10/2015 | Wentink et al. | |
| 2015/0312279 A1* | 10/2015 | Wentink | H04L 5/0073 370/329 |
| 2016/0366548 A1 | 12/2016 | Wang et al. | |
| 2018/0084386 A1 | 3/2018 | Shpak | |
| 2018/0098355 A1* | 4/2018 | Islam | H04W 74/0808 |
| 2018/0227944 A1 | 8/2018 | Yerramalli et al. | |
| 2018/0235004 A1 | 8/2018 | Cheong et al. | |
| 2018/0343589 A1 | 11/2018 | Li et al. | |
| 2019/0021116 A1 | 1/2019 | Fan et al. | |
| 2019/0082467 A1* | 3/2019 | Nunome | H04W 74/08 |
| 2019/0364492 A1 | 11/2019 | Azizi et al. | |
| 2020/0314904 A1 | 10/2020 | Fodor et al. | |
| 2021/0111766 A1* | 4/2021 | Murakami | H04W 84/12 |
| 2021/0286043 A1 | 9/2021 | Shpak | |

FOREIGN PATENT DOCUMENTS

| | | |
|---|---|---|
| EP | 3039926 B1 | 10/2020 |
| EP | 4198560 A1 | 6/2023 |
| WO | 03058887 A1 | 7/2003 |
| WO | 03088626 A2 | 10/2003 |
| WO | 2015061949 A1 | 5/2015 |
| WO | 2017105310 A1 | 6/2017 |
| WO | 2017196510 A1 | 11/2017 |

OTHER PUBLICATIONS

IEEE Std 802.11, "Local and Metropolitan Area Networks—Specific Requirements, Part 11: Wireless LAN MAC and PHY Specifications", pp. 828-829, year 2012.

International Application # PCT/IB2020/060801 Search Report dated Feb. 9, 2021.

IEEE Std 802.11n-2009, "IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 5: Enhancements for Higher Throughput," pp. 1-536, year 2009.

IEEE Std 802.11g-2003, "IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 4: Further Higher Data Rate Extension in the 2.4 GHZ Band," pp. 1-78, year 2003.

IEEE Std 802.11b-1999/Cor Jan. 2001, "IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 2: Higher-speed Physical Layer (PHY) extension in the 2.4 GHz Band—Corrigendum 1," pp. 1-23, year 2001.

KR Application # 1020227026402 Office Action dated Sep. 27, 2022.

CN Application # 20208009536.2 Office Action dated Sep. 6, 2023.

EP Application # 20917398.8 Search Report dated Feb. 5, 2024.

IEEE Std 802.11a-1999, "IEEE Standard for Information technology—Telecommunications and information exchange between systems—Local and metropolitan area networks—Specific requirements—Part 11: Wireless Medium Access Control (MAC) and Physical Layer (PHY) specifications: High Speed Physical Layer in the 5 GHz band," pp. 1-90, year 1999.

IEEE Std 802.11ac-2013, "IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz," pp. 1-425, year 2013.

IN Application # 202247042005 Office Action dated Oct. 26, 2022.

CN Application # 20208009536.2 Office Action dated Jan. 28, 2023.

JP Application # 2022545009 Office Action Mar. 7, 2023.

U.S. Appl. No. 17/976,958 Office Action dated Feb. 14, 2025.

\* cited by examiner

ANONYMOUS COLLECTION OF DIRECTIONAL TRANSMISSIONS

CROSS-REFERENCE TO RELATED APPLICATIONS

This application is a continuation in part of PCT Patent Application PCT/IB2020/060801, filed Nov. 17, 2020, which claims priority from U.S. patent application Ser. No. 16/783,196, filed Feb. 6, 2020 (now U.S. Pat. No. 11,240, 846). Both of these related applications are incorporated herein by reference.

FIELD OF THE INVENTION

The present invention relates generally to wireless communication systems, and particularly to methods for localization based on wireless network signals.

BACKGROUND

Various techniques are known in the art for finding the location of a mobile wireless transceiver, such as a cellular telephone. For example, nearly all cellular telephones now have a Global Positioning System (GPS) receiver, which derives location coordinates from signals received from geostationary satellites. Because of its dependence on weak satellite signals, however, GPS works poorly, if at all, indoors and in crowded urban environments. Cellular networks are also capable of triangulating telephone location based on signals received or transmitted between the cellular telephone and multiple cellular antennas, but this technique is inaccurate and unreliable.

A number of methods have been proposed for indoor localization based on an existing wireless local area network (WLAN) infrastructure. One such approach is described, for example, by Kotaru et al., in "SpotFi: Decimeter Level Localization using WiFi," published in SIGCOMM '15 (London, UK, Aug. 17-21, 2015). According to the authors, SpotFi computes the angle of arrival (AoA) of multipath components received from access points, and uses filtering and estimation techniques to identify the AoA of a direct path between the localization target and the access point.

As another example, U.S. Patent Application Publication 2009/0243932 describes a method for determining the location of a mobile device. The method comprises transmitting a signal between a plurality of known locations and receiving the signal at a device of unknown location, such as a mobile device. The signal may include multiple tones having different frequencies and resulting in sets of residual phase differences. The location of the mobile device may be determined using the known locations and the frequency and phase differences between the transmitted tones. In one embodiment, orthogonal frequency-division multiplexing (OFDM) signals may be used between an access point and mobile device to determine the location of the mobile device.

U.S. Pat. No. 9,814,051, whose disclosure is incorporated herein by reference, describes a method for signal processing, which includes receiving at a given location at least first and second signals transmitted respectively from at least first and second antennas of a wireless transmitter. The at least first and second signals encode identical data using a multi-carrier encoding scheme with a predefined cyclic delay between the transmitted signals. The received first and second signals are processed, using the cyclic delay, in order to derive a measure of a phase delay between the first and second signals. Based on the measure of the phase delay, an angle of departure of the first and second signals from the wireless access point to the given location is estimated.

The RTS/CTS (request to send/clear to send) mechanism is used in WLANs for the purpose of carrier sensing and collision avoidance, in accordance with the IEEE 802.11 medium access control (MAC) standard. Stations in a WLAN maintain a network allocation vector (NAV) to indicate the time during which the wireless medium is considered to be busy, and update the NAV using the RTS/CTS mechanism, as described, for example, in section 9.3.2.4 of the IEEE 802.11-2012 standard. An originating station transmits an RTS frame over the WLAN, with a receiver address (RA) indicating the MAC address of the station to which the frame is directed and a transmitter address (TA) indicating the MAC address of the station transmitting the frame. Upon receiving the RTS frame, the receiving station transmits a CTS frame, in which the RA is set to the TA value of the RTS frame. Stations that receive the RTS or CTS frame update their NAV settings and refrain from transmission for a period indicated by the NAV value. During this period, the originating station is able to transmit one or more data frames over the WLAN without contention.

U.S. Pat. No. 8,504,063 describes a method and system in which a first device may directionally transmit signals to a second device utilizing beamforming operations on multiple antennas. The first device may receive signals from the second device to establish an anonymous directional peer-to-peer wireless communication link with the second device. The transmitted signals may comprise a request-to-send (RTS) signal and the received signals may comprise a clear-to-send (CTS) signal. The transmitted signals may comprise an association identification (ID) corresponding to the first device, which may be embedded in a preamble or other portion of a frame structure. When the link is established, user information, such as profile information, for example, and/or messages may be sent from one device to the other.

SUMMARY

Embodiments of the present invention that are described hereinbelow provide improved methods and systems for location finding.

There is therefore provided, in accordance with an embodiment of the invention, a method for communication, which includes detecting, at a first station in a wireless network, a beacon transmitted over the wireless network by a second station having multiple antennas. In response to the beacon, a request-to-send (RTS) frame is transmitted over the wireless network using a multi-carrier modulation scheme from the first station to the second station. The first station receives a clear-to-send (CTS) frame transmitted over the wireless network, in response to the RTS frame, by the second station via the multiple antennas using the multi-carrier modulation scheme. An angle of transmission from the second station to the first station is estimated based on the received CTS frame.

There is further provided, in accordance with an embodiment of the invention, a method for communication, which includes detecting, at a first station in a wireless network, a beacon transmitted over the wireless network by a second station having multiple antennas. In response to the beacon, a request-to-send (RTS) frame is transmitted over the wireless network using a multi-carrier modulation scheme from the first station to the second station. The first station receives a clear-to-send (CTS) frame transmitted over the wireless network, in response to the RTS frame, by the second station via the multiple antennas using the multi-carrier modulation scheme. A property of the first station is estimated based on the received CTS frame.

In the disclosed embodiments, detecting the beacon includes identifying, at the first station, a signal transmitted by the second station using a single-carrier modulation scheme as the beacon. In one embodiment, the single-carrier modulation scheme is a complementary code keying (CCK) scheme, while the multi-carrier modulation scheme is an orthogonal frequency-division multiplexing (OFDM) scheme.

In some embodiments, detecting the beacon includes extracting a medium access control (MAC) address of the second station from the beacon, and transmitting the RTS frame includes inserting the MAC address as a receiver address (RA) in the RTS frame. In a disclosed embodiment, transmitting the RTS frame includes generating a spoofed address that encodes the MAC address of the second station, and inserting the spoofed address as a transmitter address (TA) in the RTS frame, thereby causing the second station to insert the spoofed address as the RA in the CTS frame. Receiving the CTS frame then includes decoding the RA of the CTS frame in order to identify the second station as having transmitted the CTS frame. In one embodiment, the second station includes an access point (AP) in the wireless network, and the MAC address of the second station includes a basic service set identifier (BSSID) of the AP.

Typically, after receiving the CTS frame, the first station does not transmit further frames to the second station for at least 100 ms.

In a disclosed embodiment, receiving the CTS frame includes receiving multiple signals transmitted respectively from the multiple antennas of the second station with a predefined cyclic delay between the multiple signals, and estimating the angle of departure includes measuring a phase delay between the multiple signals using the cyclic delay, and finding the angle of departure using the measured phase delay.

In some embodiments, the first station is a mobile station in a wireless local area network (WLAN), and the second station is a stationary access point (AP) in the WLAN. In one embodiment, the method includes finding location coordinates of the mobile station by estimating respective angles of departure from a plurality of APs to the mobile station. Additionally or alternatively, transmitting the RTS frame and receiving the CTS frame include transmitting and receiving the RTS and CTS frames to and from the AP without establishing an association between the mobile station and the AP.

In one embodiment, the method includes receiving the CTS frame from the second station at a third station, which did not transmit the RTS frame, and estimating an angle of transmission from the second station to the third station or a further property of the third station based on the received CTS frame.

In some embodiments, estimating the property includes processing the received CTS frame to extract channel state information (CSI), and computing a value of the property of the first station using the extracted CSI. In one embodiment, computing the value includes finding a location of the first station. Additionally or alternatively, computing the value includes finding a velocity of the first station. Further additionally or alternatively, computing the value includes detecting a periodic variation in the CSI, and applying the periodic variation in assessing periodic changes in an environment of the first station.

In some embodiments, transmitting the RTS frame includes transmitting a sequence of RTS frames in response to a motion of the first station. In a disclosed embodiment, transmitting the sequence includes setting a rate of repetition of the RTS frames responsively to a speed of the motion. The purpose of the repetition of the RTS frames is to receive a corresponding repetition of CTS frames, as input data.

There is also provided, in accordance with an embodiment of the invention, apparatus for communication, including a transceiver, which is configured to detect a beacon transmitted over a wireless network by a station having multiple antennas. A processor is configured to drive the transceiver, in response to the beacon, to transmit a request-to-send (RTS) frame over the wireless network using a multi-carrier modulation scheme to the station, and to process a clear-to-send (CTS) frame transmitted over the wireless network, in response to the RTS frame, by the station via the multiple antennas using the multi-carrier modulation scheme and received by the transceiver, in order to estimate a property, such as an angle of departure from the station to the apparatus.

There is additionally provided, in accordance with an embodiment of the invention, a computer software product, including a non-transitory computer-readable medium in which program instructions are stored, which instructions, when read by a processor, cause the processor to detect a beacon transmitted over a wireless network by a station having multiple antennas, and to transmit, in response to the beacon, a request-to-send (RTS) frame over the wireless network using a multi-carrier modulation scheme to the station, and to receive and process a clear-to-send (CTS) frame transmitted over the wireless network, in response to the RTS frame, via the multiple antennas using the multi-carrier modulation scheme in order to estimate an angle of departure from the station.

There is moreover provided, in accordance with an embodiment of the invention, a computer software product, including a non-transitory computer-readable medium in which program instructions are stored, which instructions, when read by a processor, cause the processor to detect a beacon transmitted over a wireless network by a second station having multiple antennas and received by a first station, and to transmit from the first station, in response to the beacon, a request-to-send (RTS) frame over the wireless network using a multi-carrier modulation scheme to the second station, and to receive and process a clear-to-send (CTS) frame transmitted over the wireless network, in response to the RTS frame, via the multiple antennas using the multi-carrier modulation scheme in order to estimate a property of the first station.

The present invention will be more fully understood from the following detailed description of the embodiments thereof, taken together with the drawings in which:

DETAILED DESCRIPTION OF EMBODIMENTS

Overview

Figure 1:
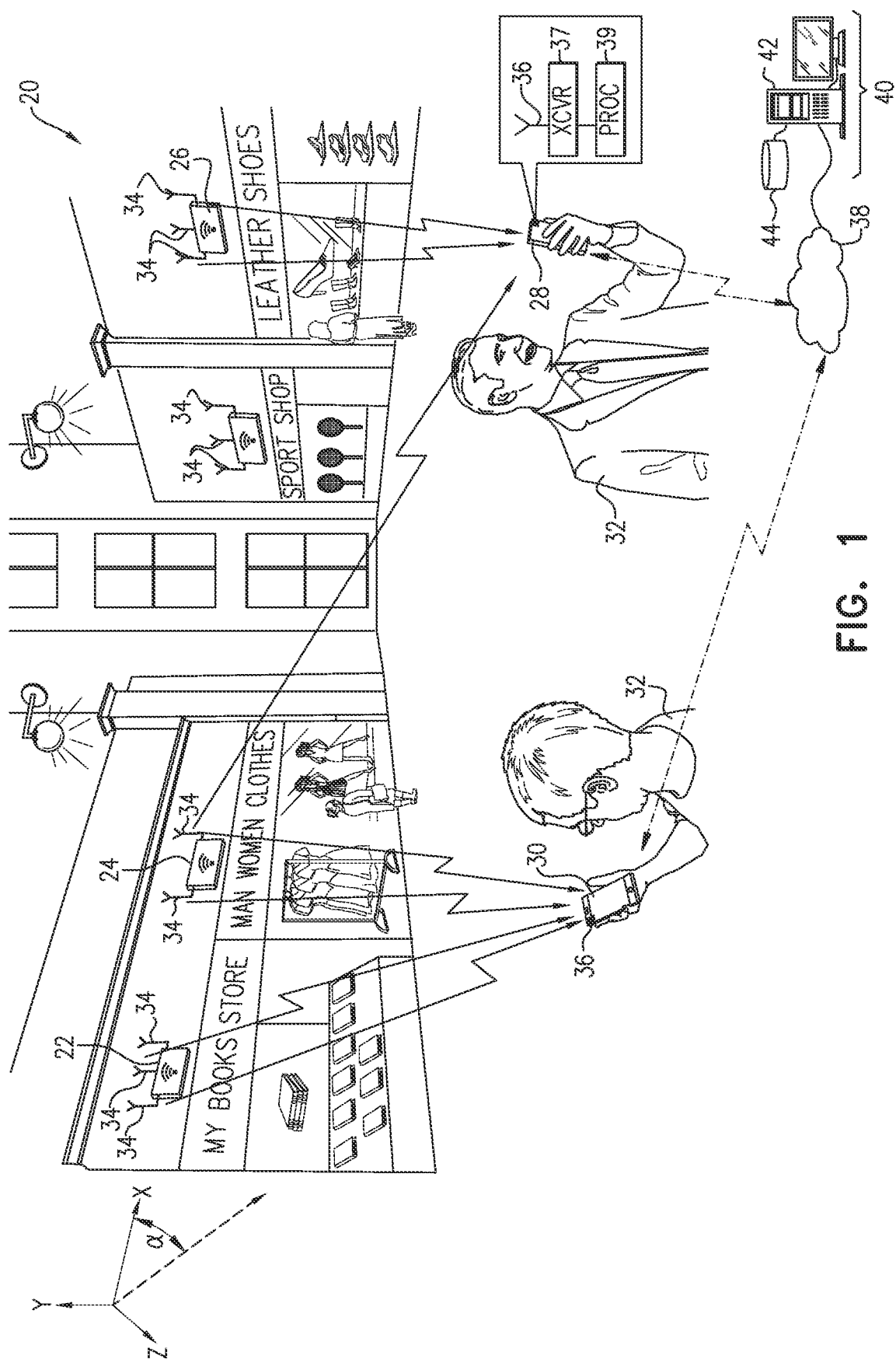
FIG. 1 is schematic, pictorial illustration of a system for wireless location finding, in accordance with an embodiment of the invention.

In a WLAN that operates in accordance with IEEE 802.11 standards, access points (APs) transmit beacon frames (commonly referred to simply as "beacons") periodically in order to announce their presence and synchronize members of their service set. The beacon includes the basic service set identifier (BSSID) of the transmitting AP and contains information regarding the capabilities of the AP.

In advanced members of the IEEE 802.11 family of standards, such as IEEE 802.11n, APs transmit downlink signals, including beacons, via multiple antennas using a multi-carrier modulation scheme (specifically OFDM). The AP introduces a predefined cyclic delay between the respective signals that are transmitted by the different antennas. The above-mentioned U.S. Pat. No. 9,814,051 explains how this cyclic delay can be used by a receiver in estimating the phase delay between the signals from the different antennas, and how the receiver can use this phase delay in finding the angle of departure of the signals from the AP to the receiver (for example in col. 13, line 11-col 18, line 45). These estimation techniques can also be applied to multi-antenna OFDM beacons (as noted in col. 15, lines 1-18). One advantage of this approach is that it enables even a mobile station with only a single antenna to find angles of departure from APs to the mobile station without requiring the mobile station to establish an association with the BSSID of any of the APs.

Earlier members of the IEEE 802.11 family, however, such as IEEE 802.11b, did not support OFDM or multi-antenna transmission. In accordance with IEEE 802.11b, APs transmit beacons in a band at around 2.4 GHz using a single-carrier modulation scheme: complementary code keying (CCK). To maintain backward-compatibility with legacy stations, many APs with more advanced capabilities, such as IEEE 802.11g and IEEE 802.11n, still transmit beacons in this manner The beacons are typically transmitted omnidirectionally, from a single antenna among the multiple antennas of the AP. Therefore, these beacons do not provide mobile stations with the phase information that is needed in order to find the angle of departure from the AP to the mobile station.

After a mobile station with 802.11g or 802.11n capabilities associates with the AP, the AP will transmit OFDM signals via its multiple antennas to the mobile station. (APs operating in accordance with IEEE 802.11n may transmit multi-antenna signals in either the 2.4 GHz band or in a band at around 5 GHz; 802.11n APs that operate in the 2.4 GHz band are sometimes referred to as "802.11ng" APs.) This association process is time-consuming, however, and requires the mobile station to present credentials, which the mobile station may not have. Applications such as those described in the above-mentioned U.S. Pat. No. 9,814,051, in which the mobile station finds its location by estimating angles of departure from multiple different APs, need a faster way to prompt APs, such as 802.11ng APs, to begin transmitting multi-antenna OFDM signals. This need is particularly acute when the mobile station is moving, for example in a moving vehicle.

Embodiments of the present invention that are described herein address this need by providing techniques that can be used by a mobile station in inducing APs to transmit multi-carrier signals via their multiple antennas, without requiring any sort of association between the mobile station and the APs. These techniques take advantage of the RTS/CTS mechanism that is described above. This mechanism is commonly implemented in hardware logic of the AP and is independent of any sort of association between the stations in the WLAN. It can thus be carried out quickly, between the mobile station and multiple different access points in turn.

In fact, the 802.11 standard requires the recipient of an RTS frame to respond within tight time limits. For this reason, the RTS/CTS mechanism is typically implemented by APs in hardware logic and does not involve any sort of authentication of the TA of the RTS frame. Some embodiments of the present invention take advantage of this feature, as well, in spoofing the of TA to encode the MAC address of the AP to which the RTS frame is directed, as explained below.

RTS/CTS is normally used for purposes of collision avoidance, and is followed immediately thereafter by transmission of one or more data frames by the station that transmitted the RTS frame. In the some of the embodiments that are described herein, however, the station transmitting the RTS frame uses the CTS frame that it then receives as a source of directional information, and typically does not transmit any further frames to the station to which the RTS frame was transmitted for a period of at least 100 ms, if not longer.

The novel applications of the RTS/CTS mechanism that are provided by embodiments of the present invention are particularly useful in finding properties of the mobile station based on the multi-carrier CTS frame. For example, the CTS frame may be processed to compute angles of departure from APs to a given mobile station. Alternatively or additionally, the mobile station may process the CTS frame to extract channel state information (CSI), and may then compute values of properties such as the location and velocity of the mobile station using the extracted CSI, even without finding the angle of departure. Further alternatively or additionally, the principles of the present invention may be applied in finding angles and directions between stations using other multi-antenna direction-finding techniques, not only between stations in an 802.11 WLAN, but also in other sorts in wireless networks.

In the particular embodiments that are described below, a first station in a wireless network, such as a mobile station in a WLAN, detects a beacon transmitted over the wireless network by a second station having multiple antennas, such as an AP. The beacon is transmitted using a single-carrier modulation scheme, such as CCK, as explained above. In response to the beacon, the first station transmits an RTS frame using a multi-carrier modulation scheme, such as OFDM, to the second station. In response to the RTS frame, the second station transmits a CTS frame via its multiple antennas using the multi-carrier modulation scheme. One or more properties of the first station can then be estimated based on the received multi-carrier CTS frame. In one embodiment, the estimated properties include the angle of transmission, for example the angle of departure, from the second station to the first station. Additionally or alternatively, the first station processes the received multi-carrier CTS frame to extract channel state information (CSI), and values of one or more properties of the first station, such as location and/or velocity of the first station, are computed using the extracted CSI.

This approach has the additional advantage of being able to serve multiple location-finding mobile stations in the proximity of an AP simultaneously. In this sort of situation, one mobile station will send an RTS frame, which will cause the remaining mobile stations to refrain from sending their own RTS frames. Most or all of these mobile stations will receive the CTS frame from the AP and will thus be able to find their own channel state information and angles of departure from the AP.

System Description

FIG. 1 is schematic, pictorial illustration of a system 20 for wireless communications and position finding, in accordance with an embodiment of the invention. By way of example, FIG. 1 shows a typical environment, such as a shopping mall or street, in which multiple access points 22, 24, 26, . . . , are deployed, often by different WLAN proprietors independently of one another. (The notation " . . . " is used in enumerating items of a given type in the present description to indicate that the pictured instances of the given type of item may be part of a larger group of such items.) Signals transmitted by the access points are received by receivers in the form of mobile stations 28, 30, . . . , which are operated by users 32 who are free to move around within the area covered by system 20. In the pictured embodiment, stations 28, 30, . . . , are shown as smartphones; but other sorts of mobile transceivers, such as laptop and tablets computers, as well as dedicated radio tags, may be used in similar fashion and can similarly find angles from departure of access points 22, 24, 26, . . . , as described hereinbelow.

Each of access points 22, 24, 26, . . . , in system 20 is assumed to have two or three antennas 34, as shown in FIG. 1. The principles of the present invention are similarly applicable to fixed transceivers having even greater numbers of antennas. Mobile stations 28, 30, . . . , are each assumed to have a single, omnidirectional antenna 36, which is connected to a radio transceiver 37; but the techniques described herein for detecting angles can similarly be implemented by multi-antenna stations. Transceiver 37 typically comprises suitable analog and digital interface circuits, as are known in the art, including physical layer (PHY) and MAC interfaces.

Each of mobile stations 28, 30, . . . , comprises a respective processor 39, which processes signals received by antenna 36 from antennas 34 in order to estimate properties such as channel state information (CSI) and angles of departure of the signals from the respective access points 22, 24, 26, . . . , as well as to extract an identifier (such as the BSSID) with regard to each access point. The angles of departure may be computed in two dimensions, assuming the access points and mobile stations to be in proximity to a common plane, or in a three-dimensional coordinate system. These angles of departure are used in finding the angles of orientation between the access points and the mobile stations in the coordinate frame of the access points (marked a in FIG. 1). The mobile stations are able to perform these functions, as described further hereinbelow, without necessarily associating with the access points.

Processor 39 typically comprises an embedded, multi-purpose microprocessor or microcontroller, which performs the functions described herein under the control of suitable software, while invoking the appropriate hardware-based functions of transceiver 37. This software may be stored on tangible, non-transitory computer-readable media, such as optical, magnetic or electronic memory media. Alternatively or additionally, at least some of the functions of processor 39 may be implemented in programmable or hard-wired logic. Typically, processors 39 also perform other computing and control functions within mobile stations 28, 30, . . . , but these functions are beyond the scope of the present invention.

In the present embodiment, one or more of access points 22, 24, 26, . . . , transmit beacons in accordance with a legacy protocol. For example, as noted earlier, an 802.11g or 802.11ng access point may transmit beacons compatible with IEEE 802.11b, which mandates that the beacons be transmitted using CCK over a single carrier in the 2.4 GHz band. The beacons provide the BSSID of the transmitting access point. Upon receiving such a beacon, a mobile station, such as mobile station 28, will initiate an RTS/CTS exchange with the access point. The mobile station transmits the RTS frame in the exchange using OFDM signals. This exchange induces the access point to transmit OFDM signals in the same band as the RTS frame, from which properties such as CSI and angle of departure can be found without necessarily creating an association between the mobile station and the access point. This functionality is described further hereinbelow with reference to FIG. 4.

At the same time, mobile stations 28, 30, . . . , may associate with one or more of access points 22, 24, 26, . . . , for purposes of Internet communications. Alternatively or additionally, the mobile stations may access the Internet via a cellular network or other connection. In any case, mobile stations 28, 30, . . . , communicate the angle-of-departure data and access point identification that they collect via a network 38 to a mapping server 40. This information may be collected and reported autonomously and automatically by a suitable application program ("app") running in the background on processor 39 in the mobile stations. Server 40 may process the data provided by the mobile stations in order to find respective location coordinates of the mobile stations, for example by triangulation, as described in the above-mentioned U.S. Pat. No. 9,814,051.

Server 40 typically comprises a general-purpose computer, comprising a programmable processor 42 and a memory 44. The functions of server 40 that are described herein are typically implemented in software running on processor 42, which may be stored on tangible, non-transitory computer-readable media, such as optical, magnetic or electronic memory media.

Figure 2:
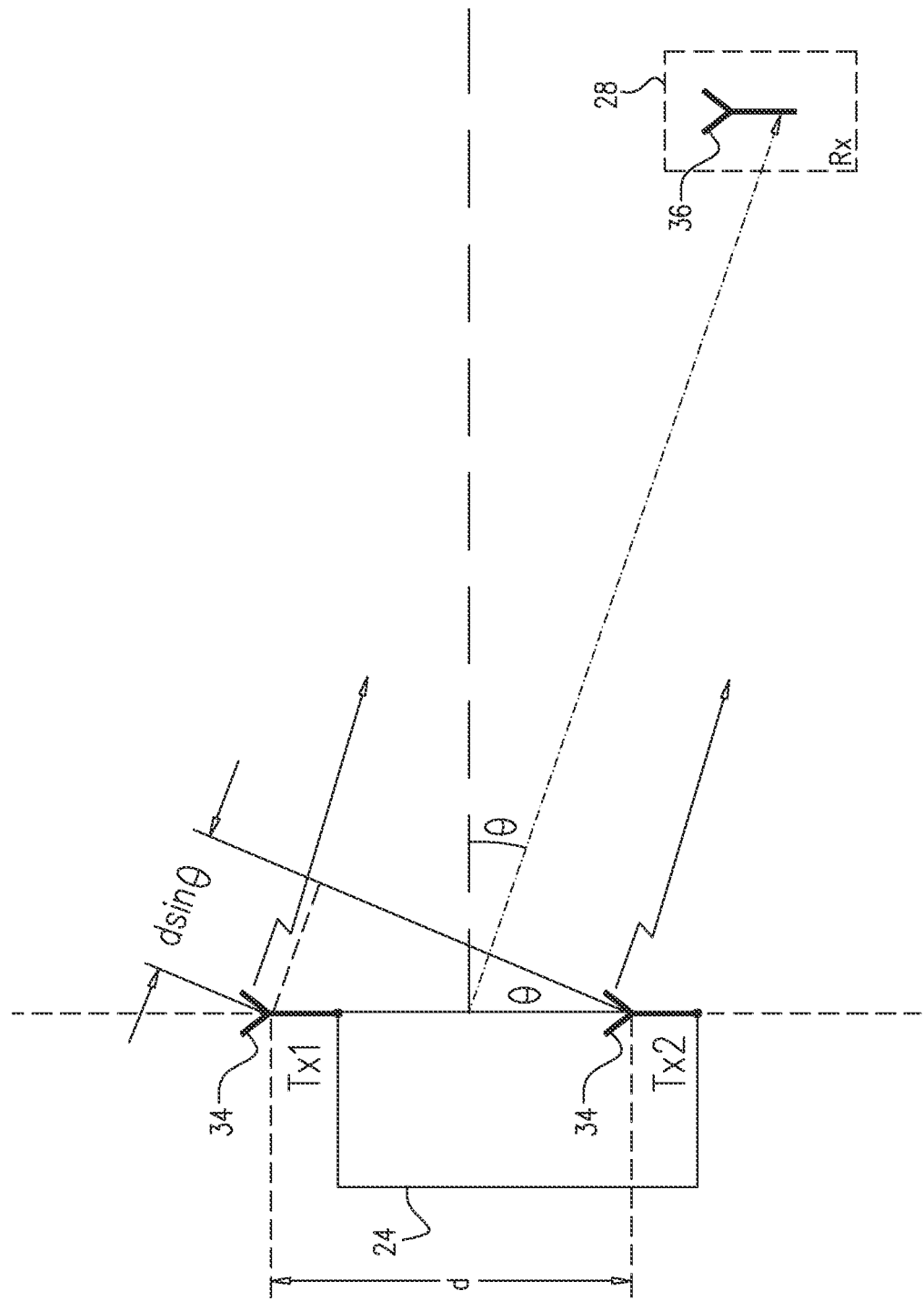
FIG. 2 is a diagram that schematically illustrates a coordinate frame used in deriving an angle of departure of wireless signals from a transmitter to a receiver, in accordance with an embodiment of the invention.

FIG. 2 is a diagram that schematically illustrates a coordinate frame used in deriving an angle of wireless signals transmitted between access point 24 and mobile station 28, in accordance with an embodiment of the invention. This particular pair of an access point and a mobile station is selected purely for convenience, and similar principles will apply to any given pair. Although access point 24 is shown as having two antennas 34 (labeled Tx1 and Tx2), the same geometrical principles apply to access points having three or more antennas arranged in a linear array.

Antennas 34 define an array axis as the line passing through the bases of the antennas. The antennas are separated along the array axis by a known inter-antenna distance d. (The array axis is the line running through antennas 34—shown as a vertical dashed line in FIG. 2.) In wireless access points, for example, the distance d is designed to be a half wavelength, for example, $\lambda/2=6.25$ cm at the standard WLAN transmission frequency of 2.4 GHz, wherein $\lambda$ is the wavelength of the radio signals. The angle of departure $\theta$ of the signals from antennas 34 to antenna 36 of mobile station 28 is taken relative to the normal to the array axis, as shown in FIG. 2. Assuming the distance from access point 24 to mobile station 28 to be considerably greater than d, there will be a difference of d*sin θ in the path length from Tx1 to antenna 36 (referred to as Rx) relative to the path length from Tx2.

As an example, assuming the length of the path from Tx2 to Rx is 6.0000 m, θ=30°, the slightly longer path from Tx1 to Rx will be 6.03125 m. This path difference translates into a 90° phase difference: Δφ=d sin(π/6)=λ/2*λ/4. The phase difference varies with angle, as well as with the wavelength (or frequency) of transmission. When access point 24 transmits OFDM signals in accordance with the IEEE 802.11n standard, for example, processor 39 in mobile station 28 can measure the phase difference Δφ on the basis of the cyclic delay between the signals transmitted by antennas 34, as described in the above-mentioned U.S. Pat. No. 9,814,051. Alternatively, processor 39 may detect and make use of other features of the signals received from antennas 34 in finding the phase difference.

Figure 3:
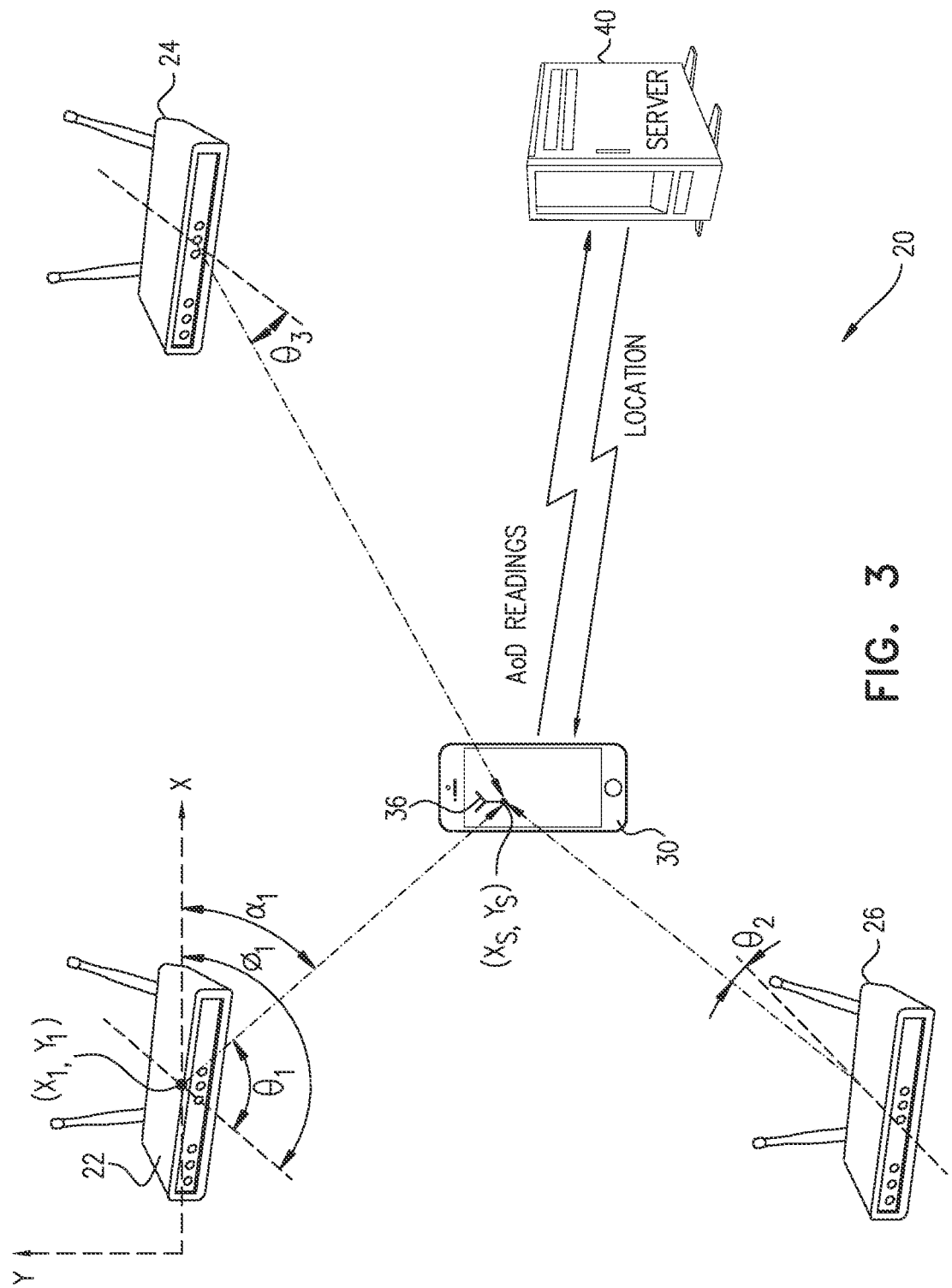
FIG. 3 is a schematic, pictorial illustration of components of the system of FIG. 1, illustrating a method for finding the location of a mobile communication device, in accordance with an embodiment of the invention.

FIG. 3 is a schematic, pictorial illustration of components of the system of FIG. 1, illustrating a method for finding the position of mobile station 30, in accordance with an embodiment of the invention. This method assumes that the respective location coordinates (labeled $x_i, y_i$) and BSSIDs of access points 22, 24 and 26 have already been mapped by server 40, in a frame of reference indicated by the (X,Y) axes in the figure. The map also indicates a respective orientation angle ($\phi_i$) for each access point, in this case the direction of a normal to the axis of the antenna array of each access point. The method of FIG. 3 uses angles of departure in a two-dimensional frame of reference (assuming the access points and mobile station to be in proximity to a common plane, as explained above). Alternatively, this method may be extended to three dimensions, mutatis mutandis.

In some embodiments, the map is constructed on the basis of measurements of angle of departure that were made previously by other mobile stations and/or other input data. The mobile stations in this case report their locations and the estimated angles of departure to server 40, along with respective identifiers of the access points, and the server constructs the map accordingly. Server 40 can build this access point map without requiring any cooperation by operators of the access points. Alternatively or additionally, the map may incorporate information provided by network operators and/or physical measurements made using dedicated equipment.

In the embodiment of FIG. 3, mobile station 30 receives multi-antenna signals from each of access points 22, 24 and 26. As noted earlier, mobile station 30 may initiate an RTS/CTS exchange with one or more of the access points in order to induce the access points to transmit such signals. The mobile station extracts the respective angle of departure (AoD) for each access point, labeled $\theta_1$, $\theta_2$, and $\theta_3$ in the figure, using the techniques described herein, along with the respective BSSIDs. Mobile station 30 reports these findings via network 38 (FIG. 1) to server 40, which returns corresponding location coordinates. The server may return the location coordinates and orientation angles of the access points $(x_i, y_i, \phi_i)$, in which case mobile station 30 can triangulate its own position $(x_s, y_s)$ based on these coordinates and the measured angles of departure. Alternatively or additionally, mobile station 30 conveys the values of the angles of departure that it has estimated to server 40, which then computes and returns the location coordinates to mobile station 30.

The location coordinates of mobile station 30 are computed by a process of triangulation: The measurements of angles of departure define rays extending from the respective location coordinates $(x_i, y_i)$ of the access points, in the fixed frame of reference of the map, at angles $\alpha_i$. These angles are defined by the expression $\phi_i = \theta_i + \alpha_i$, as given by the respective orientation angle ($\phi_i$) and the measured angle of departure ($\theta_i$) from each of the access points. The location coordinates $(x_s, y_s)$ of mobile station 30 correspond to an intersection of these rays, as shown in FIG. 3.

Additionally or alternatively, mobile station 30 may process the received CTS frames in order to estimate other properties of the mobile station, such as location, speed, or periodic variations, without necessarily relying on the AoD computations described above. In some embodiments, these properties are estimated on the basis of channel state information (CSI) that mobile station 30 extracts from the received CTS frames. The CSI in multi-carrier communications can be represented as a vector of complex values, wherein each value represents the respective signal propagation properties of one of the carrier frequencies from a given transmitting antenna 34 to antenna 36 of mobile station 30. The CSI values are typically computed by comparing the signals in a certain part of the preamble of a frame received by mobile station 30 to the expected data symbols in the preamble, as is known in the art. The CSI with respect to any given access points 22, 24, 26 varies with the location of mobile station 30 and thus represents a sort of location signature.

In one embodiment, the CSI values for signals received from access points 22, 24, 26 may be measured and mapped over an area covered by the access points. This mapping may then be used in finding the location of mobile station 30, by extracting the current CSI values from the signals received by the mobile station and comparing them to the mapped values. This sort of location estimation can also be used for purposes of geo-fencing.

In addition, the changes in the extracted CSI values over time can be used to estimate the velocity of mobile station 30. Additionally or alternatively, if the mobile station is moving at a sufficient speed to give rise to an appreciable Doppler effect, the resulting variation in the frequencies of the received signals will be reflected by the CSI and can be used to find the velocity. Furthermore, periodic variations in the CSI over time can be indicative of periodic changes in the environment of mobile station 30, such as periodic motion of a body or object to which the mobile station is attached. Measurement of the periodic changes can be used, for example, in monitoring respiration of a person when a mobile station is held firmly against the person's thorax.

When the present techniques are to be used in monitoring the location and/or velocity of mobile station 30, the mobile station will typically transmit a sequence of RTS frames as it moves in order to receive multiple, successive CTS frames in response, and thus to make successive estimates of CSI and/or AoD. In one embodiment, mobile station 30 sets the rate of repetition of the RTS frames in response to the speed of motion of the mobile station, as indicated, for example, by an inertial measurement unit (IMU) in the mobile station or by the CSI-based velocity measurements. When mobile station 30 is stationary, it will refrain from transmitting RTS frames (or will transmit them only occasionally) in order to conserve power and reduce network congestion. As the speed of the mobile station increases, it will increase the rate of RTS transmissions.

Upon receiving the RTS frames from mobile station 30, other stations in the vicinity will refrain from transmission for a certain period; but these other stations will also receive the CTS frames sent in response to the RTS frames and will be able to process the CTS frames in order to extract their own readings of CSI and/or AoD.

Inducing Multi-Antenna Transmissions by Access Points

Figure 4:
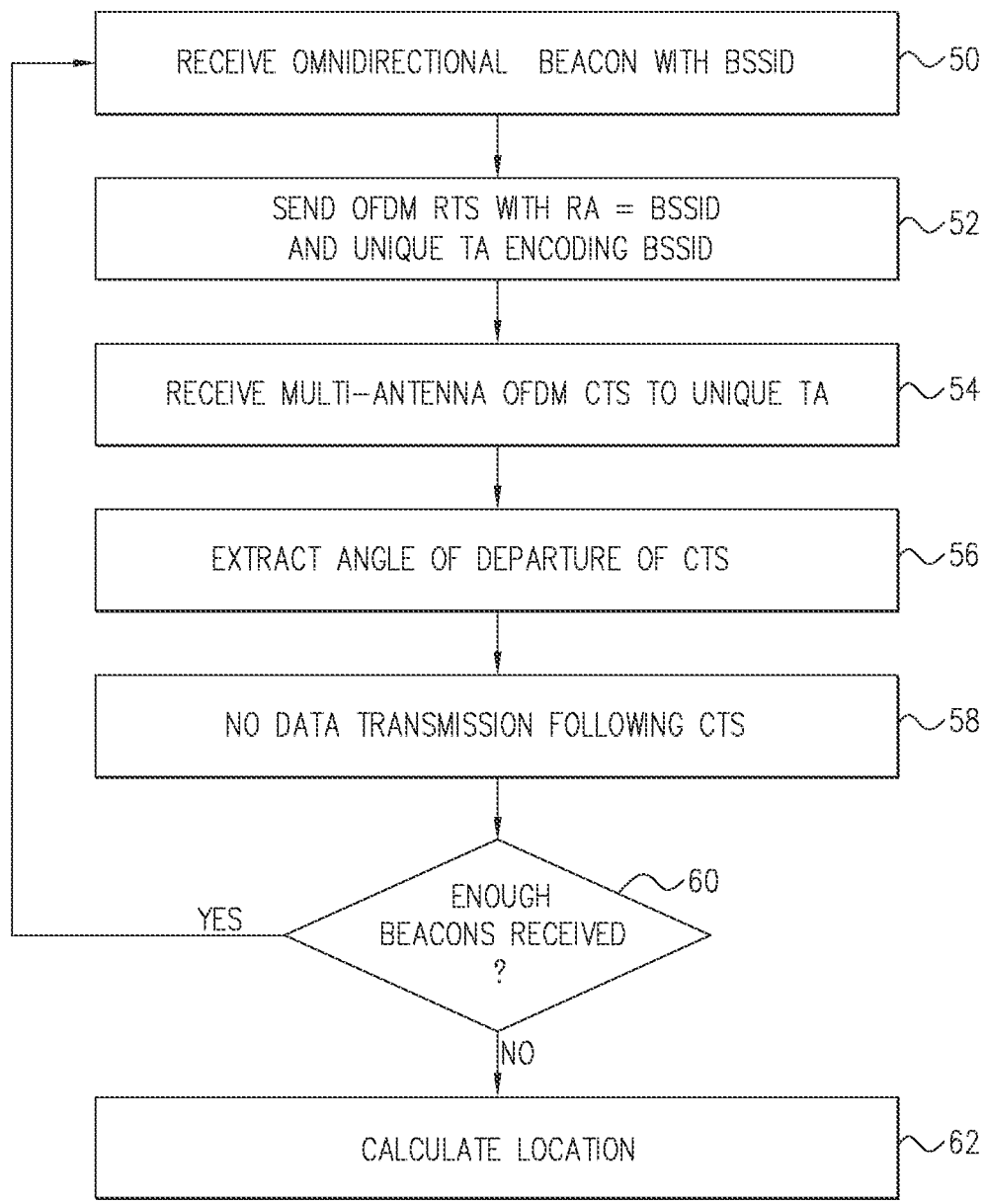
FIG. 4 is a flow chart that schematically illustrates a method for anonymous collection of directional transmissions, in accordance with an embodiment of the invention.

FIG. 4 is a flow chart that schematically illustrates a method for anonymous collection of directional transmissions, in accordance with an embodiment of the invention. The method is described hereinbelow, for the sake of concreteness and clarity, with reference to the elements of system 20, and specifically to finding the locations of mobile stations using AoD, as shown in the preceding figures and described above. Alternatively or additionally, this method may be used in extracting CSI and computing values of properties of mobile stations based on the CSI, as was likewise explained above.

Alternatively, the principles of this method may be applied, mutatis mutandis, in estimating angles of transmission among stations in other sorts of networks that support RTS/CTS functionality. The networks may operate in accordance with protocols in the IEEE 802.11 family, or in accordance with other wireless protocols that support RTS/CTS or an equivalent method for clear channel assessment. The stations implementing the method may be either mobile or stationary. For example, stationary stations may apply the present method in finding locations of mobile stations.

In the present example, mobile station 28 receives beacons from access points 22, 24, 26, . . . , at a beacon reception step 50. Each beacon contains a MAC address in the form of the BSSID of the access point transmitting the beacon. Some of the beacons may be transmitted as multi-antenna OFDM signals; and in such cases mobile station 28 will be able to derive the angle of departure without resorting to an RTS/CTS exchange. In the present example, however, it is assumed that one or more of the beacons are transmitted as omnidirectional, single-carrier signals, such as CCK signals in the 2.4 GHz band for compatibility with IEEE 802.11b.

Mobile station 28 selects an access point that transmitted an omnidirectional beacon, for example access point 22, and transmits an RTS frame to the selected access point, at an RTS transmission step 52. The mobile station transmits the RTS frame using a suitable OFDM scheme. The mobile station sets the RA of the RTS frame to be the BSSID of access point 22, as indicated by the beacon received from the access point. The mobile station may insert its own MAC address as the TA in the RTS frame; but in the present embodiment, the mobile station sets the TA to a spoofed value that uniquely encodes the BSSID of access point 22. For example, mobile station 28 may compute an XOR between the BSSID and a predefined seed of the same, standard length as the BSSID. The result will be a value unique to access point 22, having the length (in bits) of a valid TA.

Upon receiving this RTS frame, access point 22 will respond by transmitting a CTS frame, with the TA of the RTS frame inserted as the RA of the CTS frame. Access point 22 will transmit the CTS frame as a multi-antenna signal, in the same band and using the same modulation scheme as the RTS frame, i.e., using OFDM. Mobile station 28 receives the CTS frame, at a CTS reception step 54. Assuming the TA of the RTS frame was spoofed so as to encode the BSSID of access point 22, the mobile station can now decode the RA of the CTS frame in order to recover the BSSID of the access point (for example, by computing an XOR of the RA with the same seed as was used previously for encoding). Mobile station 28 measures the phase delay between the respective signals transmitted from antennas 34 in the CTS frame from access point 22, and thus estimates the angle of departure from the access point, at an angle extraction step 56. Additionally or alternatively, mobile station 28 processes the signals received form antennas 34 to extract CSI and computes values of properties such as the location and/or velocity of the mobile station based on the extracted CSI.

The use of the spoofed TA in steps 52 and 54 is advantageous, inter alia, in that it logically identifies the access point transmitting the CTS frame even though the address of the access point is not explicitly embedded in the CTS frame. This approach enables mobile station 28 to implement the present method as a stateless process, without having to keep track of the status of each RTS/CTS exchange that it has initiated. It also enables the mobile station to collect angles of departure and/or CSI of multiple access points quickly in rapid succession, thus reducing power consumption and freeing the resources of transceiver 37 (FIG. 1) for other communication tasks. Furthermore, assuming other mobile stations, such as mobile station 30, use the same location-finding application with the same seed, these other mobile stations will also be able to receive and decode the CTS frame transmitted by access point 22, and thus to find their own angles of departures and/or CSI relative to the access point. (As noted earlier, upon detecting the RTS frame transmitted at step 52, these other mobile stations will refrain from sending their own RTS frames to avoid clogging the channel.)

After receiving the CTS frame, mobile station 28 will typically not transmit further data frames to access point 22 for at least 100 ms, but rather will devote its resources to location-finding and other tasks, at a non-transmission step 58. Mobile station 28 checks (or asks server 40 to check) whether it has collected a sufficient number of measurements of angles of departure in order to find the location of the mobile station, at a sufficiency checking step 60. (Mobile station 28 may receive OFDM signals from various access points in both the 2.4 GHz and the 5 GHz bands, and may measure angles of departure of signals in both bands.) If the number of measurements is not yet sufficient, the process of FIG. 4 returns to step 50, in order to receive beacons and initiate RTS/CTS exchanges with other access points. Once a sufficient number of measurements has been collected, mobile station 28 (or server 40) combines the angular measurements, together with the known locations of the stationary access points, in calculating the location coordinates of the mobile station, at a location calculation step 62. Additionally or alternatively, mobile station 28 (or server 40) may use the extracted CSI data in finding location, velocity, and/or other properties.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
   detecting, at a first station in a wireless network, a beacon transmitted over the wireless network by a second station having multiple antennas;
   in response to the beacon, transmitting a request-to-send (RTS) frame over the wireless network using a multi-carrier modulation scheme from the first station to the second station;
   receiving at the first station a clear-to-send (CTS) frame transmitted over the wireless network, in response to the RTS frame, by the second station via the multiple antennas using the multi-carrier modulation scheme; and
   estimating a property of the first station based on the received CTS frame,
   wherein detecting the beacon comprises extracting a medium access control (MAC) address of the second station from the beacon, and wherein transmitting the RTS frame comprises inserting the MAC address as a receiver address (RA) in the RTS frame, and
   wherein transmitting the RTS frame comprises generating a spoofed address that encodes the MAC address of the second station, and inserting the spoofed address as a transmitter address (TA) in the RTS frame, thereby causing the second station to insert the spoofed address as the RA in the CTS frame.

2. The method according to claim 1, wherein detecting the beacon comprises identifying, at the first station, a signal transmitted by the second station using a single-carrier modulation scheme as the beacon.

3. The method according to claim 2, wherein the single-carrier modulation scheme is a complementary code keying (CCK) scheme, while the multi-carrier modulation scheme is an orthogonal frequency-division multiplexing (OFDM) scheme.

4. The method according to claim 1, wherein receiving the CTS frame comprises decoding the RA of the CTS frame in order to identify the second station as having transmitted the CTS frame.

5. The method according to claim 1, wherein the second station comprises an access point (AP) in the wireless network, and the MAC address of the second station comprises a basic service set identifier (BSSID) of the AP.

6. The method according to claim 1, wherein after receiving the CTS frame, the first station does not transmit further frames to the second station for at least 100 ms.

7. The method according to claim 1, wherein the first station is a mobile station in a wireless local area network (WLAN), and the second station is a stationary access point (AP) in the WLAN.

8. The method according to claim 7, wherein transmitting the RTS frame and receiving the CTS frame comprise transmitting and receiving the RTS and CTS frames to and from the AP without establishing an association between the mobile station and the AP.

9. The method according to claim 1, and comprising receiving the CTS frame from the second station at a third station, which did not transmit the RTS frame, and estimating a further property of the third station based on the CTS frame received at the third station.

10. A method for communication, comprising:
   detecting, at a first station in a wireless network, a beacon transmitted over the wireless network by a second station having multiple antennas;
   in response to the beacon, transmitting a request-to-send (RTS) frame over the wireless network using a multi-carrier modulation scheme from the first station to the second station;
   receiving at the first station a clear-to-send (CTS) frame transmitted over the wireless network, in response to the RTS frame, by the second station via the multiple antennas using the multi-carrier modulation scheme; and
   estimating a property of the first station based on the received CTS frame,
   wherein estimating the property comprises processing the received CTS frame to extract channel state information (CSI), and computing a value of the property first station using the extracted CSI, and
   wherein computing the value comprises a step selected from a group of steps consisting of:
     finding a location of the first station;
     finding a velocity of the first station; and
     detecting a periodic variation in the CSI, and applying the periodic variation in assessing periodic changes in an environment of the first station.

11. The method according to claim 10, wherein computing the value comprises finding the location of the first station.

12. The method according to claim 10, wherein computing the value comprises finding the velocity of the first station.

13. The method according to claim 10, wherein computing the value comprises detecting the periodic variation in the CSI, and applying the periodic variation in assessing periodic changes in an environment of the first station.

14. A method for communication, comprising:
   detecting, at a first station in a wireless network, a beacon transmitted over the wireless network by a second station having multiple antennas;
   in response to the beacon, transmitting a request-to-send (RTS) frame over the wireless network using a multi-carrier modulation scheme from the first station to the second station;
   receiving at the first station a clear-to-send (CTS) frame transmitted over the wireless network, in response to the RTS frame, by the second station via the multiple antennas using the multi-carrier modulation scheme; and
   estimating a property of the first station based on the received CTS frame,
   wherein transmitting the RTS frame comprises transmitting a sequence of RTS frames in response to a motion of the first station.

15. The method according to claim 14, wherein transmitting the sequence comprises setting a rate of repetition of the RTS frames responsively to a speed of the motion.

16. Apparatus for communication, comprising:
   a transceiver, which is configured to detect a beacon transmitted over a wireless network by a station having multiple antennas; and
   a processor, which is configured to drive the transceiver, in response to the beacon, to transmit a request-to-send (RTS) frame over the wireless network using a multi-carrier modulation scheme to the station, and to process a clear-to-send (CTS) frame transmitted over the wireless network, in response to the RTS frame, by the station via the multiple antennas using the multi-carrier modulation scheme and received by the transceiver, in order to estimate a property of the apparatus, wherein the processor is configured to extract a medium access control (MAC) address of the station from the beacon, and to insert the MAC address as a receiver address (RA) in the RTS frame, and wherein the processor is configured to generate a spoofed address that encodes the MAC address of the station, and to insert the spoofed address as a transmitter address (TA) in the RTS frame, thereby causing the station to insert the spoofed address as the RA in the CTS frame.

17. The apparatus according to claim 16, wherein the detected beacon comprises a signal transmitted by the second station using a single-carrier modulation scheme.

18. The apparatus according to claim 17, wherein the single-carrier modulation scheme is a complementary code keying (CCK) scheme, while the multi-carrier modulation scheme is an orthogonal frequency-division multiplexing (OFDM) scheme.

19. The apparatus according to claim 16, wherein the processor is configured to decode the RA of the CTS frame in order to identify the station as having transmitted the CTS frame.

20. The apparatus according to claim 16, wherein the station comprises an access point (AP) in the wireless network, and the MAC address of the second station comprises a basic service set identifier (BSSID) of the AP.

21. The apparatus according to claim 16, wherein after receiving the CTS frame, the processor does not transmit further frames to the station for at least 100 ms.

22. The apparatus according to claim 16, wherein the transceiver is configured for operation in a mobile station in a wireless local area network (WLAN), and the station is a stationary access point (AP) in the WLAN.

23. The apparatus according to claim 22, wherein the mobile station is configured to transmit and receive the RTS and CTS frames to and from the AP without establishing an association between the mobile station and the AP.

24. The apparatus according to claim 16, wherein the processor is configured to process the received CTS frame to extract channel state information (CSI), and to compute a value of the property using the extracted CSI.

25. The apparatus according to claim 24, wherein the value indicates a location of the first station.

26. The apparatus according to claim 24, wherein the value indicates a velocity of the first station.

27. The apparatus according to claim 24, wherein the processor is configured to detect a periodic variation in the CSI, and to apply the periodic variation in assessing periodic changes in an environment of the apparatus.

28. Apparatus for communication, comprising:
a transceiver, which is configured to detect a beacon transmitted over a wireless network by a station having multiple antennas; and
a processor, which is configured to drive the transceiver, in response to the beacon, to transmit a request-to-send (RTS) frame over the wireless network using a multi-carrier modulation scheme to the station, and to process a clear-to-send (CTS) frame transmitted over the wireless network, in response to the RTS frame, by the station via the multiple antennas using the multi-carrier modulation scheme and received by the transceiver, in order to estimate a property of the apparatus,
wherein the transceiver is configured to transmit a sequence of RTS frames in response to a motion of the apparatus.

29. The apparatus according to claim 28, wherein the processor is configured to set a rate of repetition of the RTS frames responsively to a speed of the motion.

30. A computer software product, comprising a non-transitory computer-readable medium in which program instructions are stored, which instructions, when read by a processor, cause the processor to detect a beacon transmitted over a wireless network by a second station having multiple antennas and received by a first station, and to transmit from the first station, in response to the beacon, a request-to-send (RTS) frame over the wireless network using a multi-carrier modulation scheme to the second station, and to receive and process a clear-to-send (CTS) frame transmitted over the wireless network, in response to the RTS frame, via the multiple antennas using the multi-carrier modulation scheme in order to estimate a property of the first station,
wherein the transceiver is configured to transmit a sequence of RTS frames in response to a motion of the apparatus.

* * * * *